(12) United States Patent
Muñiz Casais et al.

(10) Patent No.: US 9,362,807 B2
(45) Date of Patent: Jun. 7, 2016

(54) METHOD OF REPAIRING A WINDING IN A GENERATOR

(71) Applicant: ALSTOM WIND, S.L.U., Barcelona (ES)

(72) Inventors: César Muñiz Casais, Taradell (ES); Thomas Klamt, Birr (CH); Rafael Anderes, Birr (CH)

(73) Assignee: ALSTOM WIND, S.L.U., Barcelona (ES)

(*) Notice: Subject to any disclaimer, the term of this patent is extended or adjusted under 35 U.S.C. 154(b) by 365 days.

(21) Appl. No.: 13/770,930

(22) Filed: Feb. 19, 2013

(65) Prior Publication Data

US 2013/0212869 A1    Aug. 22, 2013

Related U.S. Application Data

(60) Provisional application No. 61/636,466, filed on Apr. 20, 2012.

(30) Foreign Application Priority Data

Feb. 20, 2012    (EP) .................................... 12382054

(51) Int. Cl.
*H01F 7/06* (2006.01)
*H02K 15/00* (2006.01)
(Continued)

(52) U.S. Cl.
CPC .............. *H02K 15/0006* (2013.01); *H02K 3/18* (2013.01); *H02K 15/0414* (2013.01); *H02K 7/1838* (2013.01); *Y02E 10/725* (2013.01); *Y10T 29/49012* (2015.01); *Y10T 29/53143* (2015.01)

(58) Field of Classification Search
CPC ................... Y10T 29/49009; Y10T 29/49012; H02K 15/16; H02K 15/03; H02K 1/16; H02K 1/276
USPC .................. 29/598, 596; 310/216.007, 156.53
See application file for complete search history.

(56) References Cited

U.S. PATENT DOCUMENTS 6,628,027 B2 * 9/2003 Fuller .............................. 310/91
7,772,738 B2 * 8/2010 Huppunen et al. ..... 310/216.001
(Continued)

FOREIGN PATENT DOCUMENTS

DE      440 448      2/1927
DE      521 107      3/1931
(Continued)

*Primary Examiner* — Paul D Kim
(74) *Attorney, Agent, or Firm* — Squire Patton Boggs (US) LLP

(57) ABSTRACT

Method of repairing a winding in a generator, the generator having a generator rotor and a generator stator, wherein the generator rotor and/or stator comprises a plurality of windings, the windings comprising a stack of turns of a conductor around a tooth, wherein the method comprises cutting the winding on a side of the tooth to separate the winding in two parts; removing the two parts of the winding from the tooth; sliding a substitute partial coil on the tooth, the substitute partial coil comprising a stack of incomplete conductor turns having a first end and a second end, said first and second end positioned on the same side of the tooth; and connecting the second ends of each incomplete turn with a first end of the next incomplete turn using a plurality of conductor portions. The disclosure further relates to a kit for making a substitute coil.

13 Claims, 5 Drawing Sheets

(51) Int. Cl.
*H02K 3/18* (2006.01)
*H02K 15/04* (2006.01)
*H02K 7/18* (2006.01)

(56) References Cited

U.S. PATENT DOCUMENTS 7,944,076 B2 * 5/2011 Stiesdal .......................... 290/55
8,362,661 B2 * 1/2013 DeBlock et al. ................ 310/59
2007/0284959 A1 * 12/2007 Huppunen et al. ....... 310/156.53

FOREIGN PATENT DOCUMENTS

| DE | 521107 | * | 3/1931 |
| DE | 42 34 129 | | 3/1995 |
| JP | 2008-228541 | | 9/2008 |
| WO | WO 2008/062633 | | 5/2008 |

* cited by examiner

METHOD OF REPAIRING A WINDING IN A GENERATOR

This application claims the benefit of European Patent Application 12382054.0 filed on Feb. 20, 2012 and U.S. Provisional Patent Application Ser. No. 61/636,466 filed on Apr. 20, 2012, the disclosures of which are hereby incorporated by reference in their entirety for all purposes.

The present disclosure relates to methods of repairing a winding in a generator, and kits for making a substitute coil of such a winding.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

A generator comprises a generator rotor and a generator stator, wherein depending on the type of generator, the rotor and/or the stator may comprise a plurality of windings. The windings may be generally formed by a coil, or a plurality of concentric coils in series, electrically connected at its ends to e.g. a converter and/or another winding of the same phase.

A coil may be formed by a stack of turns of a conductor, e.g. a copper wire or sheet, around a core. Each of the turns may be electrically insulated from the other turns and may be formed by two substantially straight parallel segments, and two curved (corner) segments. Each of the turns continues into the turn directly on top of it or directly underneath it. The electrical insulation between the turns may be provided by e.g. insulating tape or varnish.

In this disclosure, a winding is regarded as a completed coil assembly (stack of turns of a conductor) with taps (connection points).

When one or more windings are broken or need to be replaced, it is common practice to remove the rotor (or the stator) from the generator, and replace the windings that need to be replaced. However, e.g. in direct drive wind turbines employing relatively large generators, it may be very difficult and a very cumbersome task to remove the rotor from the stator for maintenance works, if at all possible. In offshore wind turbines, this type of maintenance may even be more complicated.

An alternative method of repair is possible, if the stator is built up from various stator sectors, such as disclosed in e.g. US 2007/284959. Substitution of a coil in this case comprises substitution of a complete sector, including the stator frame, stator core, and coils. An important drawback of this method is that a part of the generator is substituted. Thus, subsequently a very precise adjustment of the air gap needs to be carried out on site.

There is thus still a need to provide a generator for wind turbines, and for other applications, in which windings may more easily be repaired. The methods and kits discussed in the present disclosure may equally be applied to any other kind of generator comprising windings mounted around teeth of either the generator or rotor. They may in particular be advantageous in applications with relatively large generators and/or in cases in which the access to the generator is complicated.

SUMMARY

In a first aspect, the present disclosure provides a method for repairing a winding in a generator, wherein the generator has a generator rotor and a generator stator, and wherein the generator rotor and/or the generator stator comprises a plurality of windings, the windings comprising a stack of turns of a conductor around a tooth. The method comprises cutting the winding at one side of the tooth to separate the winding in two parts and removing the two parts of the winding from the tooth. Subsequently, a substitute partial coil may be slid on the tooth, the substitute partial coil comprising a stack of incomplete conductor turns having a first end and a second end, said first and second end being positioned on the same side of the tooth. Finally, the second ends of each incomplete turn may be connected with a first end of the next incomplete turn.

According to this aspect, a winding is split, such that one part may be slid off a tooth in one direction and the other part may be slid off the tooth in the other direction. Then, a substitute partial coil may be slid on the tooth from one of the sides. Finally, the turns of the partial coil may be completed by providing suitable conductor portions. A second end of a turn is connected with a first end of the next incomplete turn located directly on top, or located directly underneath. This way, a winding may be replaced in a relatively easy manner, without having to remove e.g. a rotor from a stator.

In some embodiments, connecting the second ends of each incomplete turn with a first end of the next incomplete turn (directly on top or underneath), comprises connecting the incomplete turns one by one. A particularly simple manner of providing a substitute winding is thus provided. In other embodiments, connecting the second ends of each incomplete turn with a first end of the next incomplete turn comprises connecting all the incomplete turns at the same time. In this case, a pre-assembled stack of conductor portions may be used, which may save time during maintenance.

The conductor portions may be attached at their ends to the incomplete turns by e.g. brazing and/or a mechanical interlocking.

In further embodiments, each winding may comprise an inner coil comprising a stack of turns of conductor around a tooth, and an outer coil comprising a stack of turns of conductor around the tooth, and the method may comprise cutting the inner coil and the outer coil to separate the coils in two parts and removing the parts of the coils from the tooth. Then, a substitute inner partial coil may be arranged on the tooth, the substitute inner partial coil comprising a stack of incomplete turns having a first end and a second end, said first and second ends being positioned on the same side of the tooth. This substitute partial coil may e.g. be slid on from one side of the tooth. Subsequently, the second ends of each incomplete turn of the inner partial coil are connected with a first end of the next incomplete winding (located on top of it or located underneath it) using suitable conductor portions. Once the inner coil has been completed, a substitute outer partial coil may be slid on the tooth, the substitute outer partial coil comprising a stack of incomplete turns having a first end and a second end, said first and second ends being positioned on the same side of the tooth. Finally, the second ends of each incomplete turn of the outer partial coil may be connected with a first end of the next incomplete winding using a plurality of conductor portions. The same method of repair may thus be used in cases wherein there are multiple concentric coils, such as two or three or more. In embodiments wherein the inner coil and outer coil are connected in series, the last winding of one of the coils may be connected with the first winding of the other coil.

In another aspect, the present disclosure provides a kit for making a substitute coil for use in a tooth wound generator rotor or stator, comprising a stack of incomplete turns of a conductor having a first and a second end, and a plurality of connectors for connecting the second end of each incomplete turn with the first end of the next incomplete turn.

In some embodiments, the plurality of connectors may be pre-assembled in a stack.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1A:
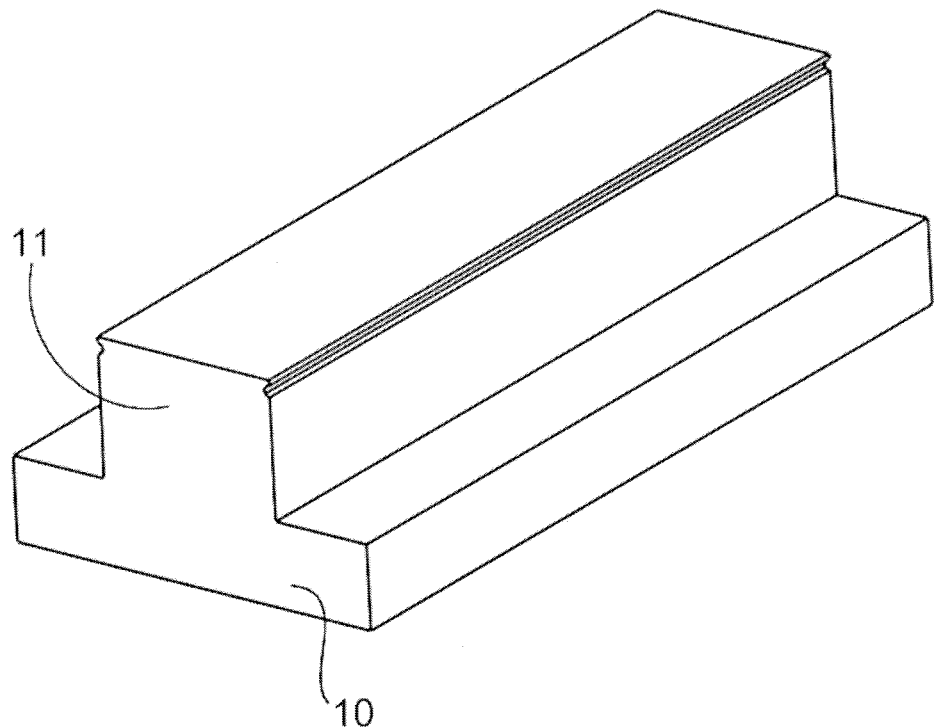
FIGS. 1a-1g illustrate various steps of methods of repairing windings according to embodiments of the present invention.

FIG. 1a illustrates a tooth around which a winding may be provided. The tooth may be part of a generator rotor or a generator stator. In this example, it is assumed that a generator stator with salient poles is portrayed. Reference sign 10 refers to a stator rim, and reference sign 11 refers to the tooth. In this view, the winding that needed to be repaired or replaced has been removed from the tooth.

Figure 1B:
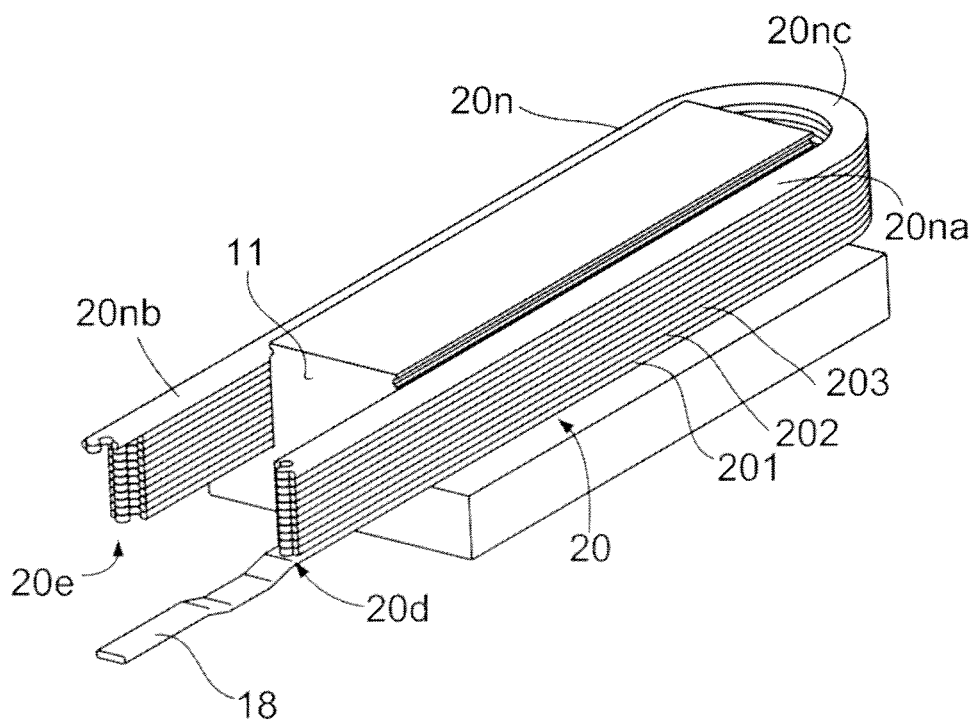

FIG. 1b illustrates a partial coil 20 comprising a stack of incomplete turns 201, 202, 203, etc. Incomplete turn 20n comprises straight portions 20na and 20nb connected by curved portion 20nc. The first ends of the incomplete turns are located on the same side as the second ends of the incomplete turns. This way, the stack of incomplete turns may be easily slid around the tooth. In FIG. 1b, the stack of incomplete turns may be slid onto the tooth from behind.

The first turn may comprise a tap 18 for electrically connecting to a converter, another coil or the electrical grid.

The first end of each turn may be regarded as the "starting point" of each turn. In the illustrated case, the first turn of the coil is the one of the bottom. It will be clear that in reality it is irrelevant whether the first turn is the one on the bottom or the one on the top.

Figure 1C:
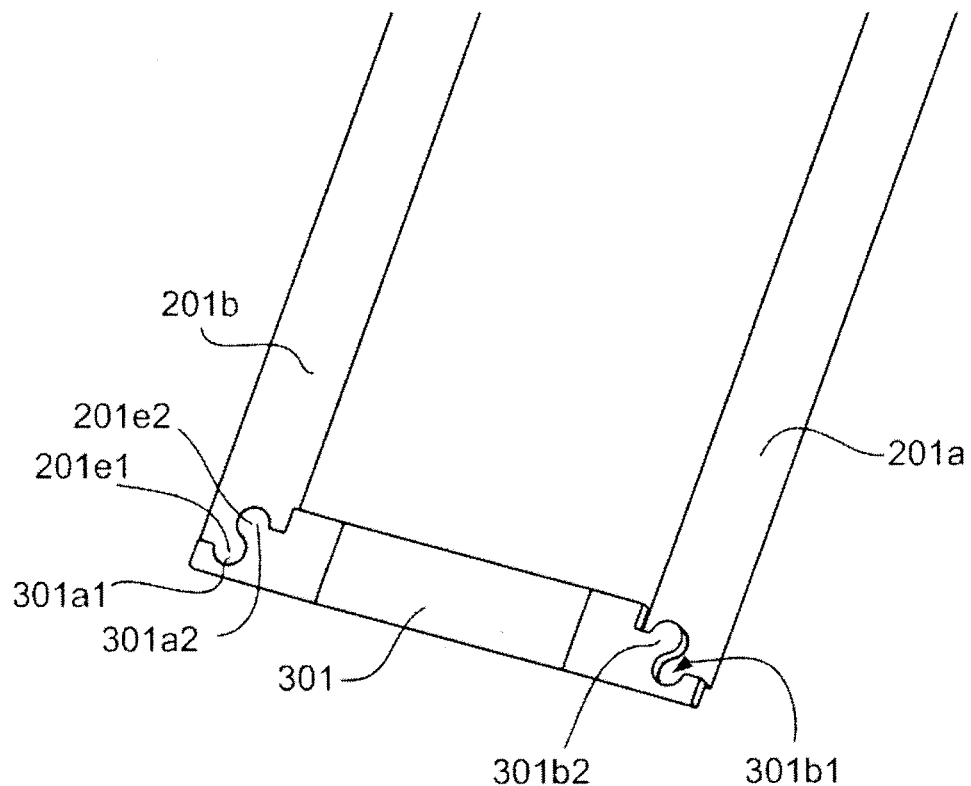

FIG. 1c illustrates a possible next step in the method of repairing a winding. An incomplete turn comprising straight portions 201a and 201b is presented. A second end of the incomplete turn comprises an end cut along a diagonal line. With respect to this diagonal line, the second end comprises a protruding portion 201e1 and a recess 201e2. Similarly, the first end of the incomplete turn comprises a similar protrusion and recess with respect to a diagonal line. As such, an end portion resembling a piece of a jigsaw puzzle is provided.

The conductor portion 301 is arranged to connect the second end of incomplete turn 201 with the first end of the incomplete turn 202 (not shown), which in this case is arranged directly on top of incomplete turn 201. The conductor portion may be substantially straight and as such easy to manufacture. In an alternative embodiment, intermediate conductor portions may be curved as well.

The conductor portion 301 shown in FIG. 1C comprises ends that are designed to mechanically interlock with the second end of incomplete turn 201 and the first end of incomplete turn 202. To this end, they comprise similar recesses and protrusions along a diagonal line. Alternatively or in addition to this mechanical interlock the conductor portions may be brazed or glued to the incomplete turns. If no mechanical interlocking is provided, the intermediate conductor portions may comprise straight ends.

In the illustrated embodiment, the conductor turns are made of metal sheet. An aspect of these embodiments is that it may be relatively easy to connect conductor portions to each of the incomplete turns.

Figure 1D:
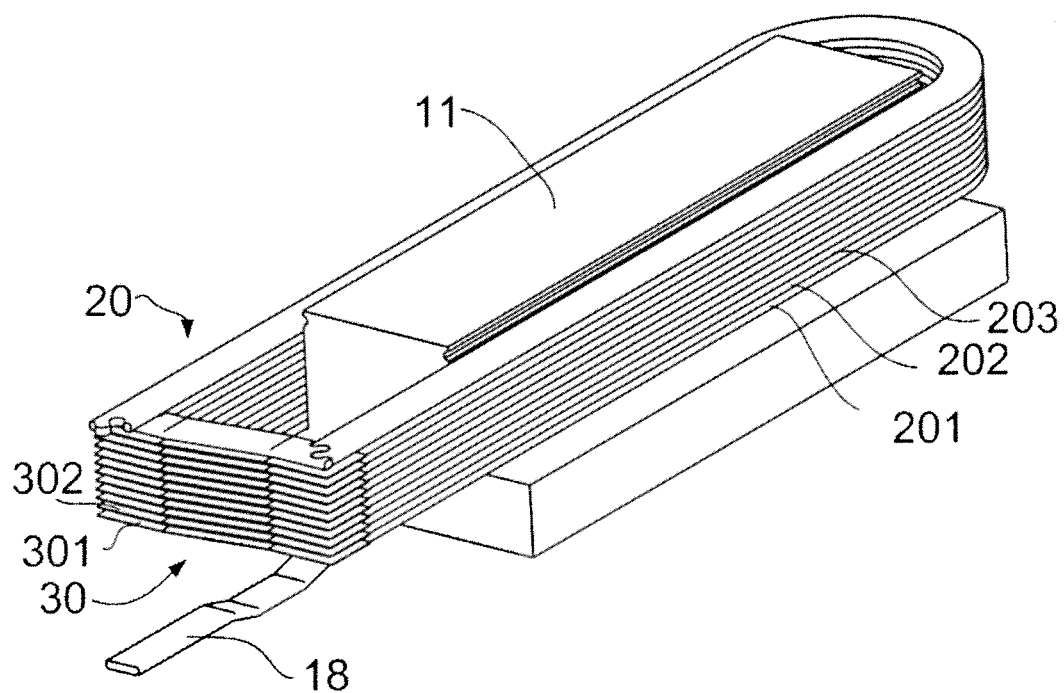

FIG. 1d illustrates the result of connecting all incomplete turns so as to complete the coil. The stack of incomplete turns 201, 202, 203 etc. may be completed one by one. Alternatively, a stack of conductor portions 30 comprising conductor portions 301, 302 etc. may be provided that in a single step completes a plurality, or substantially all incomplete windings.

In preparation of a repair, pre-prepared kits comprising a stack of incomplete turns of a conductor having a first and a second end, and a plurality of conductor portions for connecting the second end of each incomplete turn with the first end of the next incomplete turn may be provided. The conductor portions may comprise a plurality of separate conductor portions or they may be pre-assembled in a stack.

Figure 1E:
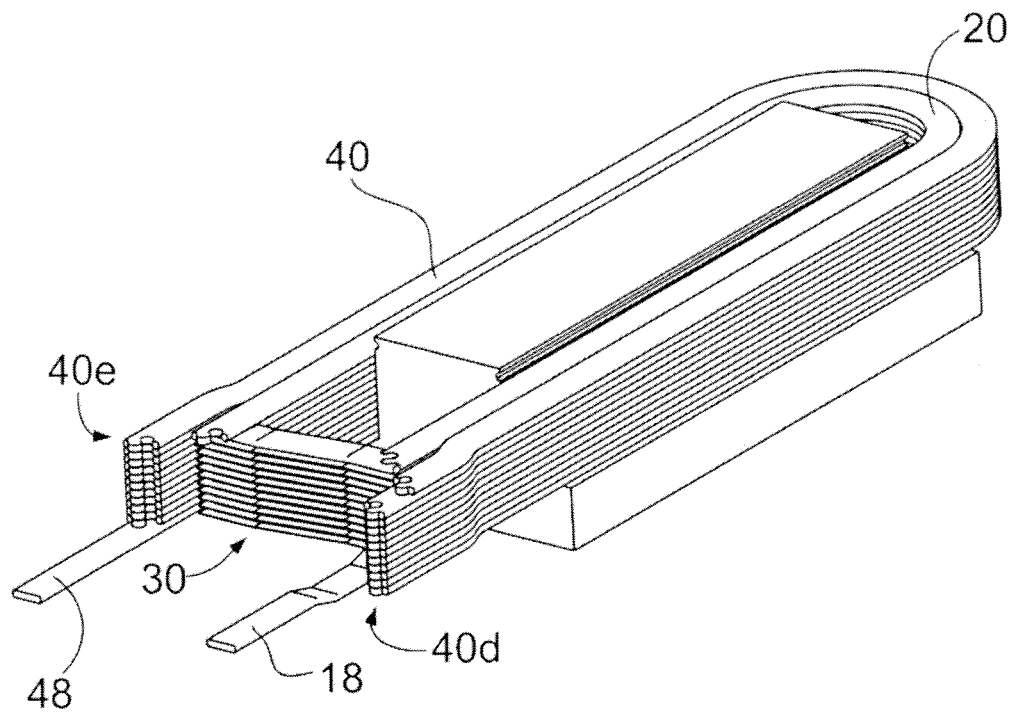

FIG. 1e illustrates an embodiment wherein a winding comprises two concentric coils. After the inner coil has been completed, a substitute outer partial coil 40 having a stack of incomplete turns may be slid on the tooth from the same side as the inner partial coil before. Each of the incomplete turns comprises a first end, schematically indicated with reference sign 40d, and a second end, schematically indicated with reference sign 40e. The last turn of the outer coil comprises a tap 48.

Figure 1F:
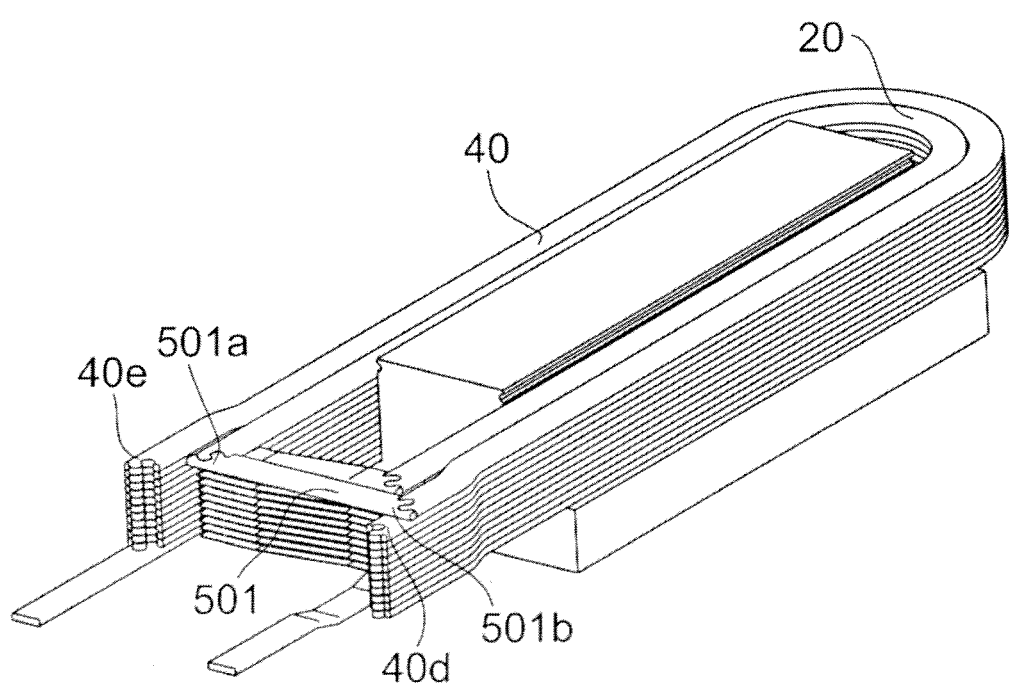

In this embodiment, the inner coil and outer coil are connected in series. The last turn of the inner coil (in this case, located at the top) is connected to the first turn of the outer coil. A conductor portion 501 may be connected at its first end 501a to the last turn of the inner coil, and may be connected at its second end 501b to the first turn of the outer coil, see FIG. 1f.

Figure 1G:
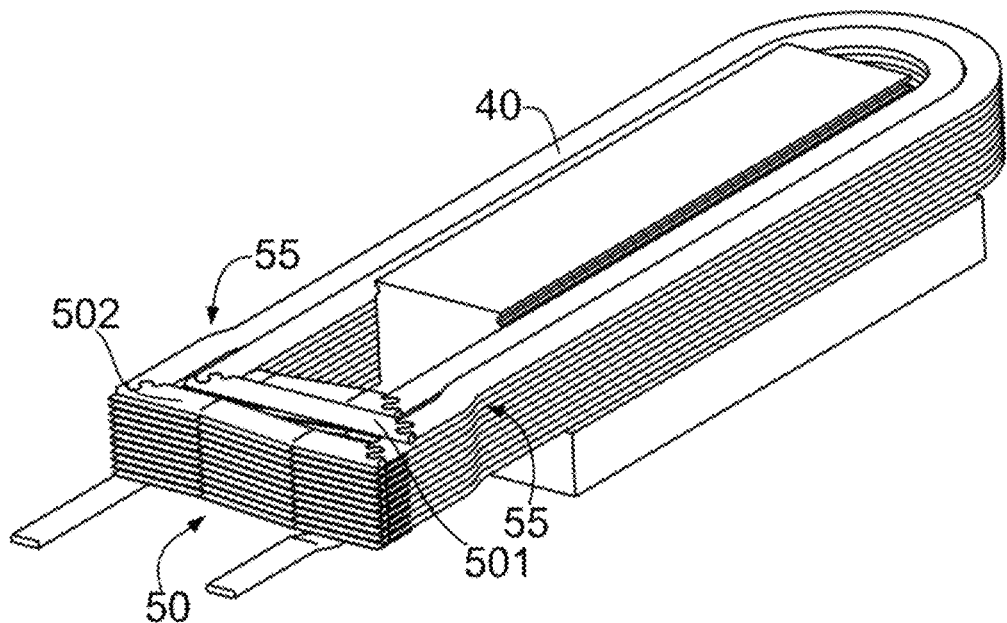

FIG. 1g illustrates the situation in which the outer partial coil 40 has been completed using a stack 50 of conductor portions 502, etc. In alternative embodiments, each of the incomplete turns may be completed one by one. FIG. 1g further illustrates that the outer coil may comprise a local widening 55 to create more space and ensure proper insulation near the first and second ends of the incomplete coils.

In cases of an inner coil and an outer coil, pre-prepared kits may be provided for each of the separate coils.

In a further alternative embodiment, the inner and outer coil may form part of a different phase and are not connected in series. In such a case, it will be clear that there will be no conductor portion connecting the two coils.

Figure 2:
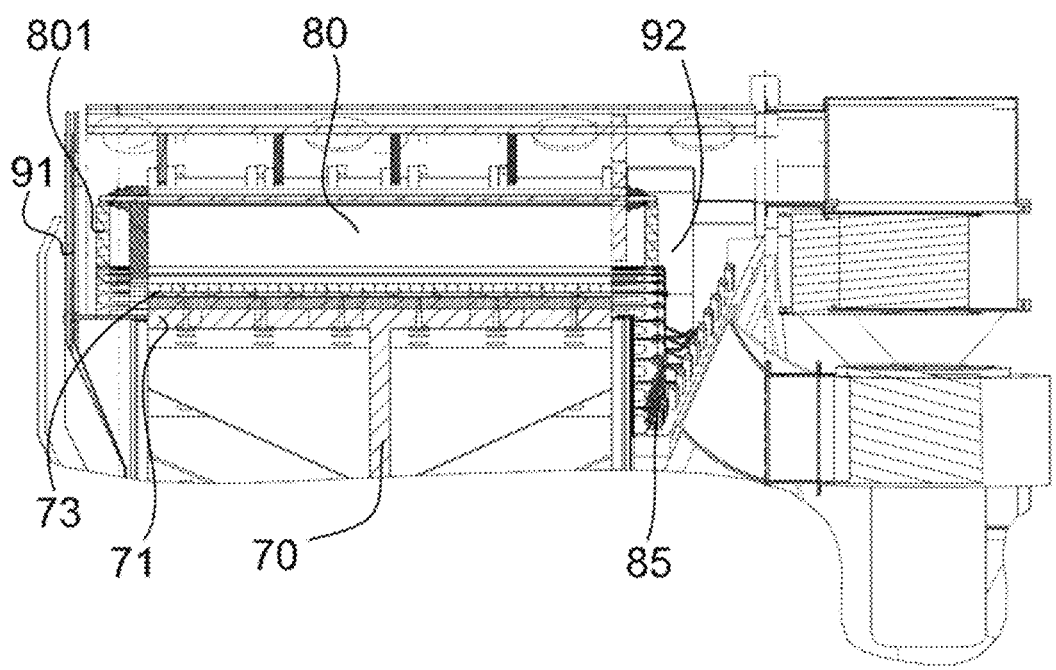
FIG. 2 illustrates a prior art generator in a direct drive wind turbine.
Figure 3:
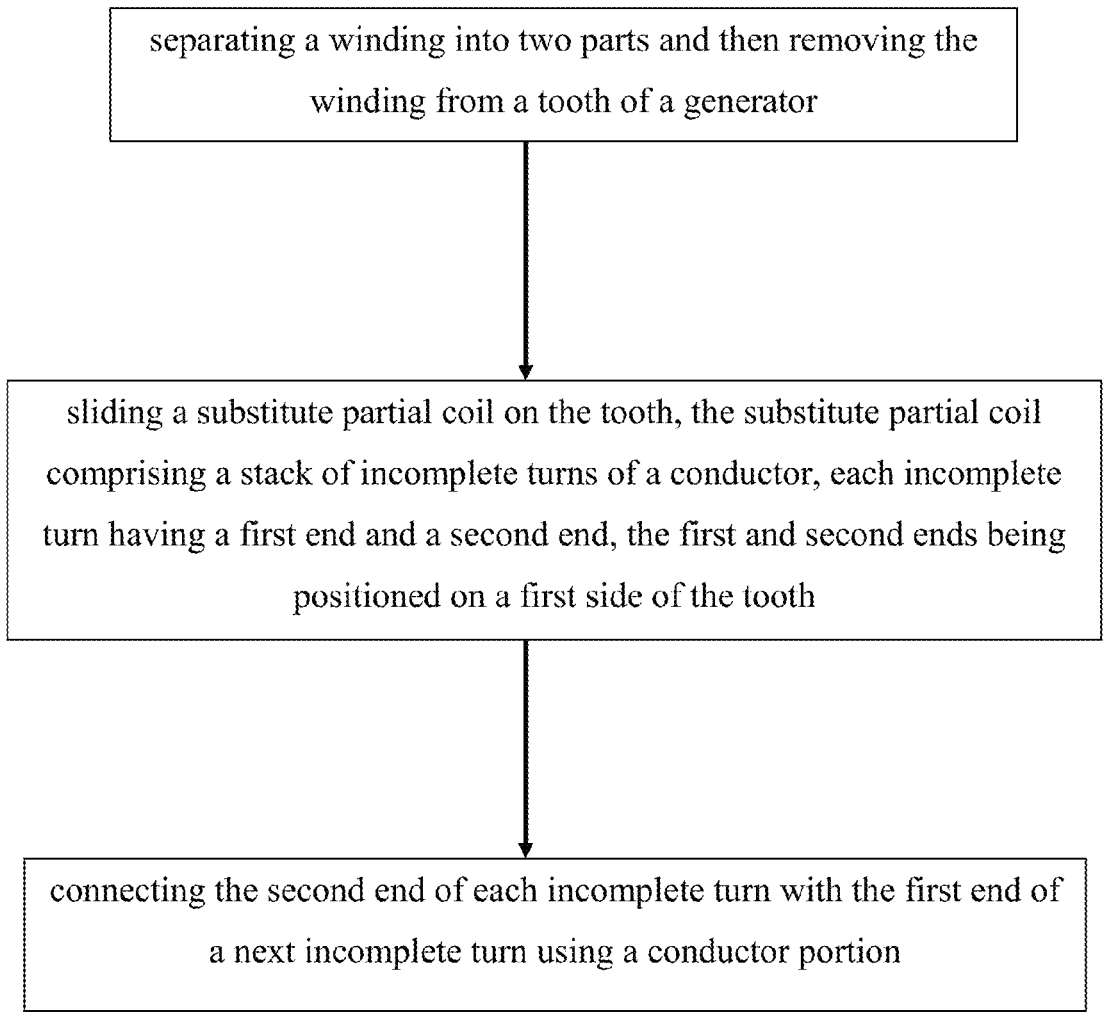
FIG. 3 is a method for repairing a winding in a generator.

FIG. 2 illustrates a portion of the generator of a direct drive wind turbine. In this embodiment, the generator may comprise a generator rotor 70 and a generator stator 80. Generator rotor 70 has a rotor rim 71 upon which a plurality of permanent magnets 73 is arranged. The generator stator 80 comprises a plurality of teeth extending radially inward. Around each of the teeth, one or more coils 801 may be arranged. Under the influence of the wind, the rotor (hub and blades) may be set in rotation. The generator rotor may be operatively connected with the rotor.

According to prior art methods, if a coil needs to be replaced, the whole rotor would need to be removed in order to access a coil. This may be a very complicated, cumbersome and complicated procedure. If a wind turbine is placed offshore, such a procedure would even be more costly.

According to embodiments of the present invention, a coil may be cut either at the front 91 of the teeth or at the rear 92. Once the coil has been separated in two parts, the parts may be removed from the front and rear respectively. Depending on the precise design of the wind turbine, possibly a front cover or rear cover of the generator housing or a portion of the covers may be arranged to be removable.

A substitute coil may be arranged in accordance with previously illustrated methods, and previously illustrated pre-prepared kits may be used.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of repairing a winding in a generator having a plurality of windings, the winding comprising a stack of turns of a conductor around a tooth of the generator, the method comprising:
    separating the winding into two parts, and then removing the two parts of the winding from the tooth;
    after removing the two parts of the winding from the tooth, sliding a substitute partial coil on the tooth, the substitute partial coil comprising a stack of incomplete turns of a conductor, each incomplete turn having a first end and a second end, the first and second ends being positioned on a first side of the tooth; and
    connecting the second end of each incomplete turn with the first end of a next incomplete turn using a conductor portion.

2. The method according to claim 1, wherein the generator includes a rotor and a stator, and the stator comprises the plurality of windings.

3. The method according to claim 1, wherein the generator includes a rotor and a stator, and the rotor comprises the plurality of windings.

4. The method according to claim 1, wherein the generator is a wind turbine generator.

5. The method according to claim 1, wherein connecting the second end of each incomplete turn with the first end of the next incomplete turn comprises connecting the incomplete turns one by one using a plurality of conductor portions.

6. The method according to claim 5, wherein the conductor portions are attached to the incomplete turns by brazing.

7. The method according to claim 5, wherein the conductor portions are attached to the incomplete turns by mechanical interlocking.

8. The method according to claim 1, wherein connecting the second end of each incomplete turn with the first end of the next incomplete turn comprises connecting all the incomplete turns at the same time by a stack of preassembled conductor portions.

9. The method according to claim 8, wherein the conductor portions are attached to the incomplete turns by mechanical interlocking and brazing.

10. The method according to claim 1, wherein each winding comprises an inner coil comprising a stack of turns of a conductor around the tooth, and an outer coil comprising a stack of turns of a conductor around the inner partial coil and the tooth,
    wherein the separating the winding into two parts and then removing the two parts of the winding from the tooth further includes separating each of the inner and the outer coils into two parts then removing each of the two parts of the winding from the tooth,
    wherein the substitute partial coil is a substitute inner partial coil, and
    wherein the method further comprises
        sliding a substitute outer partial coil on the tooth, the substitute outer partial coil comprising a stack of incomplete turns having a first end and a second end, the first and second ends being positioned on the same side of the tooth;
        connecting the second end of each incomplete turn of the outer partial coil with a first end of a next incomplete turn of the outer partial coil.

11. The method according to claim 10, wherein the inner partial coil and the outer partial coil are connected in series, and wherein the method further comprises connecting the second end of a last turn of the inner partial coil with the first end of a first turn of the outer partial coil.

12. The method according to claim 10, wherein connecting the second end of each incomplete turn of the inner partial coil with a first end of the next incomplete turn of the inner partial coil comprises connecting all the incomplete turns of the inner partial coil at the same time by a stack of preassembled conductor portions.

13. The method according to claim 10, wherein connecting the second end of each incomplete turn of the outer partial coil with a first end of the next incomplete turn of the outer partial coil comprises connecting all the incomplete turns of the outer partial coil at the same time by a stack of preassembled conductor portions.

* * * * *